United States Patent [19]

Eckberg

[11] 4,348,454

[45] Sep. 7, 1982

[54] ULTRAVIOLET LIGHT CURABLE ACRYLIC FUNCTIONAL SILICONE COMPOSITIONS

[75] Inventor: Richard P. Eckberg, Round Lake, N.Y.

[73] Assignee: General Electric Company, Waterford, N.Y.

[21] Appl. No.: 239,297

[22] Filed: Mar. 2, 1981

[51] Int. Cl.$^3$ .................... C08G 77/20; B32B 27/16
[52] U.S. Cl. .............................. 428/334; 204/159.13; 428/40; 428/447; 428/452; 525/479; 528/25; 528/26; 556/451; 427/54.1
[58] Field of Search ................... 528/26, 25; 525/479; 204/159.13; 556/451; 428/40, 334, 452; 427/54.1

[56] References Cited

U.S. PATENT DOCUMENTS 3,198,766  8/1965  Nitzsche et al. ................. 528/26
4,201,808  5/1980  Cully et al. ........................ 428/40

*Primary Examiner*—Wilbert J. Briggs, Sr.
*Attorney, Agent, or Firm*—Michael J. Doyle

[57] ABSTRACT

Acrylic functional siloxane polymer compositions which are especially useful for ultraviolet curable silicone release coating applications are provided as a reaction product of omega-chloro-1-alkenes, dialkylhydrogen chainstopped polydialkylalkylhydrogen siloxane copolymers, catalytic amounts of precious metal complexes and acrylic functional monomers.

17 Claims, No Drawings

ULTRAVIOLET LIGHT CURABLE ACRYLIC FUNCTIONAL SILICONE COMPOSITIONS

FIELD OF THE INVENTION

The present invention is related to acrylic functional silicones and polyorganosiloxane copolymeric compositions which are curable or crosslinkable upon exposure to ultraviolet light or radiation, and which are particularly useful in silicone based release coating applications.

BACKGROUND OF THE INVENTION

Silicone release compositions, and especially paper release compositions, are widely used as coatings which release pressure-sensitive adhesives for labels, transfer tapes, decorative laminates, and the like. Such silicone products are most commonly sold as dispersions of reactive high molecular weight polysiloxane gums in organic solvents, such as toluene. A crosslinking or curing catalyst is then added to the dispersed low-solids mixture, the coating blend is applied to the substrate which is then passed through an oven to evaporate the carrier solvent and cure the silicones to a relatively non-adherent release surface. This process requires a large thermal energy input in order to properly evaporate the solvents and effect the crosslinking reaction at commercially viable rates.

Rising energy costs coupled with stringent environmental regulation of solvent emissions have made the use of solvent-borne silicone release agents increasingly uneconomical. While solventless or emulsion-borne silicone compositions can solve the environmental problems, high oven temperatures and expensive energy usage are still required for their proper application.

Radiation-curable silicone release compositions successfully address both the energy and environmental problems inherent in the use of traditional solvent-dispersed silicones. For example, an ultraviolet (UV) radiation-curable solventless silicone release composition eliminates the need for energy-intensive ovens as well as expensive solvent recovery apparatus. Such materials are not unknown; considerable literature in the field of UV-curable silicone compositions has been noted in recent years, although commercial introduction of such products has not yet occurred. Applicant's copending application Ser. No. 63,648 filed Aug. 3, 1979, and which is hereby incorporated by reference, describes epoxy-functional silicone compositions which are curable upon exposure to ultraviolet radiation and which utilize certain bis-aryl halonium salts as photoinitiators.

Several other UV-cure silicone systems have been described. Patents issued to R. V. Viventi (U.S. Pat. No. 3,816,282 issued June 6, 1974), Bokerman et al. (U.S. Pat. No. 4,052,529 issued Oct. 4, 1977), and Colquhoun et al. (U.S. Pat. No. 4,070,526 issued Jan. 25, 1978) are representative of those compositions wherein omega-mercaptoalkyl substituents attached to polysiloxanes add to vinyl-functional siloxanes in a free-radical process in the presence of certain photosensitizers upon UV irradiation. However, those silicone materials which include mercaptoalkyl functional protoactive substituents also possess an offensive odor (associated with the mercaptan group) which persists in the cured material.

The present invention provides newly developed radiation-curable silicone paper release compositions which do not require scarce or expensive inputs. These novel compositions are comprised of acrylic or methacrylic-dimethylsilicone fluids which will cure via well-known free radical processes when irradiated with UV light in the presence of standard photoinitiators.

Acrylic-functional silicones are themselves not a new concept. R. L. Mercker described polymers prepared from acryloxymethyl and methacryloxymethyl substituted organosilicone compounds in U.S. Pat. No. 2,956,044 which issued Oct. 11, 1960. Merker's syntheses of acryloxymethyl-substituted silicones required chloromethyl-substituted organosilicones as inputs. Such silicones are themselves prepared by halogenation of methyl-substituted silicones or by reaction of halosilanes with Grignard reagents followed by hydrolysis in order to produce the desired polymer. Neither of these processes is well-suited to large scale commercial production, and chloromethyl-substituted silicone polymers and monomers are scarce and expensive materials.

Another synthetic route to acrylic-siloxane compositions is taught by Nordstrom and Zelek (U.S. Pat. No. 3,650,811 which issued Mar. 3, 1972). The Nordstrom et al. synthesis involves the reaction of omega-hydroxyalkylacrylates or methacrylates with silanol-containing silicones in the presence of condensation catalysts such as tetraisopropyltitanate. In practice, the resulting acryloxy-substituted polymers are severely limited since the reactive acrylic groups are confined to the chainstopper position (i.e. at the ends of the linear polymer molecules). The lack of reactive sites on the polymer chains causes the free-radical crosslinking reaction between the acrylic moieties to proceed very slowly, rendering such compositions impractical for high-speed processing operations common in the paper converting industry.

U.S. Pat. No. 4,201,808—Cully et al, discloses paper release compositions curable by radiation consisting of acryloxy-group-containing silicone fluids plus polyacrylic-crosslinking agents and photosensitizers as needed. Although the Cully et al. disclosure is related to the compositions of the present invention, there are significant differences between the materials described by Cully et al. and those disclosed in the present application. Most important, the Cully et al. disclosure specifies that their coating composition must consist of two parts: the acryloxy-functional silicone fluid plus at least 10% (with 50% being preferred) of a polyacrylate monomer such as trimethylolpropane triacrylate (i.e. a non-silicone reactive diluent). The coating compositions of the present invention do not require reactive diluents or crosslinkers while providing useful rates of cure. Nor are such materials required for good release properties. Furthermore, the compositions of the present invention provide useful release characteristics yet consist solely of an acrylic-functional silicone fluid with photosensitizers as needed. Additionally, although the Cully et al. disclosure does not specify any particular preferred mode of manufacture of the acrylic-siloxane fluids described therein, the examples provided by Cully et al. appear to suggest that hydrosilation addition of allyl(meth)acrylate to hydride fluids is the synthetic route utilized. Whereas, on the other hand, a significant feature of the present disclosure is the production of acrylic-functional silicones via consecutive addition of (meth)allylchloride and acrylic acid to hydride fluids as described herein below.

The compositions of the present invention herein described do not suffer from any of the inherent disadvantages discussed above. All of the inputs for synthesis of these UV-curable paper release compositions are inexpensive and readily available. The synthesis itself is an easy stepwise procedure which can be performed in a single reaction vessel if desired.

It is therefore an object of the present invention to provide novel acrylic functional silicone compositions and copolymers which are capable of being crosslinked upon exposure to ultraviolet radiation.

It is another object to provide acrylic-functional polyorganosiloxanes and copolymers of such siloxanes by a process comprising the steps of adding allylchloride and acrylic acid to hydride-containing siloxanes.

It is another object to provide processes for the synthesis of acrylic functional silicones for use in release coating applications.

It is another object to provide ultraviolet light curable acrylic functional silicone release coating compositions and methods for use.

These and other objects will become apparent to those skilled in the art upon consideration of the following description, examples and claims.

SUMMARY OF THE INVENTION

The present invention provides acrylic functional silicone compositions and silicone release coatings made from such compositions as well as processes for providing the same.

An acrylic functional polyorganosiloxane composition of the present invention is comprised of the reaction product of a number of constituent ingredients. The relative proportions of these components are not at all critical and may be varied over a wide range to provide acrylic-silicone compositions having varied properties. The method described below describes a simple and preferred two-step synthesis, but it will be recognized that alterations in the synthetic procedure can be accomplished if desired without detracting from the spirit of the present invention.

The instant acrylic functional polyorganosiloxane compositions will have a first component comprised of an omega-haloalkene and preferably an omega-chloro-1-alkene such as allyl chloride, 4-chloro-1-butene, 10-chloro-1-decene, and other analogous unsaturated halogen-containing hydrocarbons.

Of course, it will be recognized that mixtures of such omega-halo-alkenes will also be useful. Ordinarily, from 0.5 to 50 weight percent of such alkenes will be used compared to the total weight of the acrylic functional silicone composition reaction product.

The next component is a dialkylhydrogen chainstopped polydialkyl-alkylhydrogensiloxane copolymer. Such a hydrogen functional siloxane will ordinarily have the general formula:

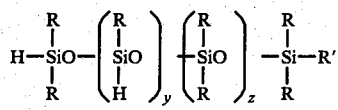

wherein each R represents, independently, a monovalent hydrocarbon radical such as methyl, ethyl, phenyl or trifluoroproyl, but will ordinarily be a methyl radical, R' represents, independently, the same monovalent hydrocarbon radicals as for R by may additionally represent a hydrogen atom, y plus z is an integer of, approximately 25 to 600 such that the siloxane fluid has a viscosity of 20 to 5000 centipoise at 25° C. and preferably 100 to 500 centipoise. Such hydrogen functional siloxane fluids are primarily linear and will therefore have an R to Si ratio of approximately 2 to 1. However, minor and insignificant amounts of mono and trifunctional siloxane units, some of which may also contain hydrogen, might also be included without seriously detracting from the usefulness of such fluids. These siloxane fluids will ordinarily have 0.5 to 50 weight percent hydrogen-siloxy functionality, and are made by processes well known in the art.

The alkene component and the hydrogen functional siloxane component are reacted in a precious metal catalyzed addition cure reaction which is a partial cure or precrosslinking reaction described in detail below. Such catalysts are well known in the silicone art and will ordinarily be a platinum metal complex effective for adding hydrogen to the double bond of the alkene. Ordinarily approximately 50 parts platinum metal per million parts of siloxane will be effective to promote this hydrosilation reaction. Examples are those exemplified in U.S. Pat. Nos. 3,220,972; 3,814,730; 3,775,452 and 3,715,334, each of which is hereby incorporated by reference. Particularly useful are those platinum catalysts derived from chloroplatinic acid which has been treated with tetramethyldivinyldisiloxane, as described in U.S. Pat. No. 3,814,730 which is incorporated by reference.

The final component of the reaction mixture is an acrylic monomer which adds the acrylic functionality to the silicone compositions of the present invention. A wide variety of acrylic monomers are effective, including acrylic acid, methacrylic acid, 2-hydroxyethyl acrylate, 2-hydroxyethyl methacrylate, and other (meth)acrylic acid esters containing a reactive hydroxyl group, including multifunctional acrylic monomers such as pentaerythritol triacrylate. Ordinarily, approximately 0.2 to 30 weight % of this acrylic material based upon the weight of the total reaction product will be effective for providing an acrylic-siloxane copolymer having 0.5 to 50% acrylic siloxy functionality.

The acrylic-silicone release coating compositions are comprised of the above described acrylic silicone fluid which is further comprised of an amount of free radical photoinitiator which is effective for curing a 0.1 to 5.0 mil coating of said composition to a non-adherent film on a substrate such as paper upon exposure to an amount of ultraviolet or electron beam radiation which is effective for curing such coatings.

Approximately 1.0 to 10.0% by weight based upon the entire coating composition will ordinarily be an effective amount of photoinitiator. Among the particularly useful free radical photoinitiators are included diethoxyacetophenone, benzophene, Michler's ketone, t-butylbenzoin ether and certain combinations of amines and aryl ketones well known to those skilled in the art.

The process for providing the acrylic functional polyorganosiloxane compositions of the present invention ordinarily comprises the steps of reacting (A) 1 to 50 parts by weight of an omega-halo-alkene; (B) 50 to 99 parts by weight of a dialkylhydrogen chainstopped polydialkyl-alkylhydrogen siloxane copolymer; (C) an amount of precious metal catalyst effective for catalysing a hydrosilation reaction between said alkene and said siloxane copolymer; and (D) 0.2 to 30 parts by weight of an acrylic functional monomer effective for providing a siloxane copolymer having 0.5 to 50 weight percent acrylic siloxy units.

DESCRIPTION OF THE INVENTION

The symbol ≡Si is well known in the silicone art and schematically depicts the non-reactive or non-functional portion of a large silicone polymer. Ordinarily, the major portion of a silicone molecule (e.g. a dimethylsiloxy chain) does not take part in curing or crosslinking reactions nor in syntheses involving the production of copolymers. Thus the reactive species (e.g. hydrogen and vinyl, epoxy or acrylic radicals) which may be attached to the polymeric backbone are chemically more interesting for such reactions. Thus ≡SiH represents a large silicone polymer having at least one reactive or functional hydrogen attached thereto, either on the chain or at its terminus. "Precrosslinking" of this intermediate polymer can be accomplished by simultaneously reacting a dimethylvinyl-stopped linear dimethylsilicone fluid and (meth)allyl chloride with a polymer containing one or more alkyl-hydrogen siloxy units or dialkylhydrogen silyl chain-stopping units.

The expression "pre-crosslinking" represents a partial cure or crosslinking reaction which is controllably allowed to proceed at an early stage in the synthesis of these silicone materials. This partial crosslinking serves the very useful purpose of enabling a fast, tight and complete final cure to take place with relatively very little energy input upon exposure to a small amount of ultraviolet light. Since the silicone material is only partially crosslinked, i.e., "precrosslinked", it is still workable as a coating composition yet quite capable of a quick cure to a final non-adherent surface such as a release coating.

In general terms, acrylic functional silicone polymers are provided as follows: first allylchloride is reacted with an ≡SiH-functional dimethyl silicone fluid in the presence of a catalytic amount of a group VIII precious metal hydrosilation catalyst, thereby yielding a gamma-chloropropyl-functional dimethylsilicone copolymer via standard hydrosilation addition.

Next the resultant gamma-chloropropyl-methyl silicone fluid is treated with acrylic acid, methacrylic acid, or 2-hydroxyethyl acrylate or methacrylate in the presence of a tertiary base such as triethylamine (Et₃N) or pyridine to yield an acrylic functional silicone polymer. This series of reactions can be depicted in the following fashion:

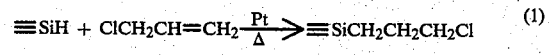

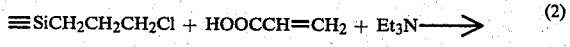

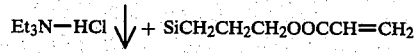

The amine hydrochloride salt is a solid precipitate which can be easily removed by filtration. Any omega-chloro-1-alkene can be utilized in place of allylchloride in step [1] (e.g., 4-chloro-1-butene, 10-chloro-1-decene, etc.) but allylchloride is inexpensive and easily obtained and is preferred.

Persons skilled in the art will recognize that this procedure offers several advantages over previously described syntheses of acrylic-functional silicones. Most important, this process is versatile: acrylic-functional silicones can be prepared with up to 100% acrylic functionality either on the polymer chains or as chainstoppers; also, the polymer may easily be modified by inclusion of other vinyl-functional groups (such as vinyl-stopped polysiloxanes) with allylchloride in the hydrosilation step. The resultant acrylic-functional silicones are hydrolytically stable, since the acrylic moiety is bonded to silicon through an alkyl group rather than through an oxygen atom. Another advantage is that the intermediate gamma-chloropropyl-substituted siloxanes need not be isolated; the total amount of acrylic functionality in the product will be determined by the amount and nature of the ≡SiH present in the input silicone fluid.

C. L. Schilling and C. S. Eschback, *XIV Organosilicon Symposium*, Fort Worth, Texas, March 28, 1980, have described important differences in reactivity between methallyl or allyl compounds and ≡SiH-containing substances in platinum-catalyzed addition reactions. It was reported that methallyl compounds provide higher yields of hydrosilation products than do the allyl counterparts and that these higher yields result from less extensive side reactions such as isomerization and elimination.

The above-described two-stage synthesis of acrylic-functional silicone polymer fluids can be repeated with a processing difference being the substitution of methallyl chloride ($CH_2{=}C(CH_3)CH_2Cl$) for allyl chloride ($CH_2{=}CHCH_2Cl$) in the first step of the synthesis. Examples 4 and 5 below demonstrate the utility of this methallyl chloride approach. These two examples can be chemically represented by this reaction scheme:

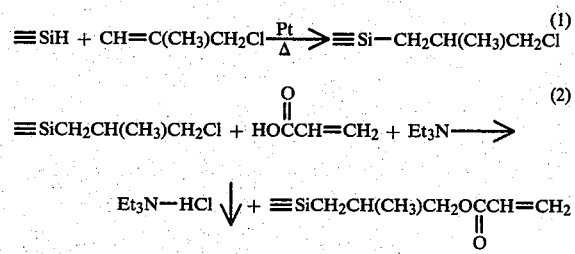

These syntheses may be carried out in a single reaction flask, which simplifies processing. It should also be pointed out that the reagents utilized (methallyl chloride, acrylic acid, and triethylamine) are all inexpensive and commercially available materials. The use of methallyl chloride in place of allylchloride does not preclude the use of 2-hydroxyethylacrylate or other hydroxy-containing acrylates or methacrylates rather than acrylic acid; also, any tertiary amine hydrogenchloride acceptor may be substituted for triethylamine without affecting the product. It has also been established that multifunctional acrylate monomers containing one or more hydroxyl groups may be used in place of the hydroxyl-containing monofunctional acrylate monomers heretofore specified as the source of reactive photocrosslinkable acrylate functionality. Example 10 below is illustrative of this effect. The reaction of a gamma-chloroisopropyl-functional siloxane with pentaerythritoltriacrylate (PETA) in the presence of an amine can be represented in this fashion:

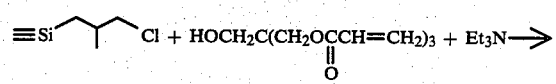

-continued

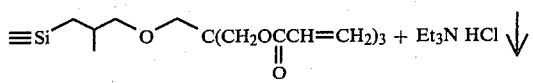

wherein each mole of PETA reacting provides 3 moles of acrylate.

In order that those skilled in the art may better practice the teachings of the present invention, the following examples are given for purposes of illustrating the invention and are not intended to limit the invention. Unless otherwise specified, all weights are given by percent.

DESCRIPTION OF THE PREFERRED EMBODIMENTS

EXAMPLE 1

35 grams of allylchloride were dissolved in 300 grams hexane in a 2 liter flask equipped with overhead stirrer, reflux condenser, and thermometer. Sufficient platinum catalyst ($H_2PtCl_6$ complexed with tetramethyldivinyldisiloxane) was added to provide approximately 10 parts platinum per million parts reactant material. Next 300 grams of a dimethylhydrogen-stopped linear polydimethylmethylhydrosiloxane copolymer fluid having an approximate viscosity of 80 centipoise and containing 8.5% ≡SiH functionality (as a percent of methylhydrogen siloxy units) were slowly added to the allylchloride solution. Following this addition, the reaction mixture was refluxed at 69° for 20 hours with continued stirring, at which point infrared analysis detected no unreacted ≡SiH groups. The hexane and excess allyl chloride were then removed by stripping at 70° and 30 mm Hg pressure for two hours, leaving a hazy fluid product of 100 cps. viscosity. Next, 150 grams of this fluid product were dispersed in 150 grams toluene with 0.01 gram hydroquinone. A mixture of 15 grams acrylic acid and 21 grams triethylamine were added, and the complete reaction mixture was stirred under a nitrogen purge at 100° for 30 minutes. A white precipitate was formed during the reaction. Following the reaction, the product was filtered and the toluene stripped off, affording a cloudy brown acrylic functional silicone fluid having a viscosity of 620 centipoise.

EXAMPLE 2

30 grams allylchloride and 24 grams of a 150 centipoise dimethylvinyl-stopped linear dimethyl fluid and 0.05 grams of the same platinum catalyst utilized in Example 1 were dissolved in 1 liter of toluene in a 3 liter flask. Next, 300 grams of a dimethylhydrogen-stopped linear polydimethyl-methylhydrosiloxane copolymer, having a viscosity of 120 centipoise and containing 6.2% MeH functionality were slowly added to the allyl chloride mixture with stirring. Following this addition, the catalyzed reaction mixture was refluxed at 100° to 110° C. for 2 hours, at which point no unreacted ≡SiH was detected. The toluene solvent was stripped off to yield a clear fluid product. 200 grams of the above product were dispersed in 600 grams toluene with 15 grams acrylic acid and 1 gram Hydroquinone. 17 grams of pyridine were slowly added to the stirred solution under $N_2$ atmosphere at room temperature. A crystalline white precipitate developed immediately upon addition of the pyridine. After stirring at 25°–30° C. for an hour under the nitrogen atmosphere, the solution was filtered, and the filtrate was then stripped to remove toluene solvent. A hazy white acrylic functional silicone fluid product was obtained, having a viscosity of 340 centipoise.

EXAMPLE 3

50 grams allylchloride and 40 grams dimethyl vinyl-stopped linear dimethyl fluid and 0.05 grams of the same platinum catalyst were dissolved in 1500 grams toluene. 500 grams of the ≡SiH—functional fluid utilized in Example 2 above were slowly added to the stirring mixture; following this addition, the complete reaction mixture was refluxed at 95°–110° C. for 4 hours at which time no unreacted ≡SiH was detected. Unreacted allylchloride was then stripped off, and sufficient toluene was removed under vacuum to increase the solids content of the product solution to 50% by weight. Then, 308 grams of this solution were transferred to a 1 liter flask, and 19 grams of 2-hydroxyethylacrylate and 0.1 grams hydroquinone were added. 13 grams of pyridine were then added to the reaction mixture under a nitrogen purge at 26° C. As in the examples above, a crystalline precipitate formed as the amine was added. Following the addition of pyridine, the total reaction mass was filtered, and toluene stripped out of the filtrate to furnish a hazy acrylic functional silicone fluid product having a viscosity of 500 centipoise.

EXAMPLE 4

Another acrylic functional polysiloxane was prepared in a fashion analogous to Example 3, except that 2-hydroxyethylmethacrylate was substituted in this synthesis for 2-hydroxyethylacrylate in the previous synthesis, yielding a methacrylic-functional silicone fluid product.

EXAMPLE 5

330 grams of the ≡SiH fluid utilized in Example 2 were slowly added to a solution of 33 grams allyl chloride and 26 grams of the vinyl fluid utilized in Example 2 and 0.1 gram of the same platinum catalyst in 500 grams toluene. After refluxing this mixture at 110° C. for 4 hours all reactive ≡SiH was consumed. At this point any excess allyl chloride was removed by stirring the reaction mixture under 25 mm Hg vacuum for 30 minutes at 34° C. Next, 25 grams acrylic acid were then added with 0.05 grams hydroquinone. 35 grams triethylamine were slowly added to the reaction mixture under a nitrogen purge at 32° pot temperature. The complete mixture was allowed to stir for 16 hours at room temperature, then toluene was removed by vacuum strip at 100° C. The final product was obtained as a clear yellow viscous fluid after removal of $Et_3N$ HCl precipitate via filtration. It should be noted that the processing described above was a one kettle process.

Ultraviolet evaluations described herein were accomplished using a PPG model 1202AN UV Processor. The PPG device utilizes two Hanovia medium-pressure mercury vapor UV sources delivering 300 watts/square inch focused power to irradiated surfaces. Samples to be exposed to UV light are affixed to a rigid carrier board, then passed under the lamps on a conveyor belt which operates at variable speeds from 5 to 500 ft/minute resulting in exposure times varying from about 6 to 0.06 seconds for any individual pass under the lamps.

The efficacy of these acrylic or methacrylic-functional silicone fluids as UV-curable paper release coatings was determined in the following fashion: 10 gram samples of candidate fluids were catalyzed with 0.5 grams of Trigonal 14 (trademark of Noury Chemical Corporation) UV catalyst. Trigonal 14 is a standard benzoin ether-derived free-radical photoinitiator. Catalyzed blends were applied as 0.5 mil coatings to 4"×10" sections of 40 pound supercalendered Kraft (SCK) stock by means of a doctor blade. Samples so coated were loaded onto the moving conveyer and exposed to the UV radiation under inert atmosphere for varying amounts of time dependent on line speed.

Following exposure, the resultant films were evaluated for cure and for their potential as release agents by qualitatively determining the respective films' rub-off, smear, and migration characteristcs.

Rub-off occurs when a cured silicone coating will not adhere to a substrate and can be rubbed off in little balls of silicone by using finger pressure. Smear is defined as an incompletely cured coating which displays an obvious, permanent streak when a finger is firmly pressed across it. Migration is detected by the Scotch (registered trademark of the 3M Company) cellophane tape test. The coating is considered to be well-cured and migration-free if a piece of Scotch tape will stick to itself after having first been firmly pressed to the coating, then removed and doubled back on itself. If a coating is migration-free by means of the Scotch tape test, it is presumed to be a release coating, as it has been shown to adhere to the substrate with an adhesive force much greater than the adhesive force between the cured composition and the released aggressive Scotch tape adhesive.

When catalyzed and coated as described above, all of the candidate materials synthesized in Examples 1 through 5 were found to cure to non-adherent coatings on SCK. The UV exposure times required for cure to smear-, rub-off-, and migration-free surfaces are noted in the table below:

| Fluid | UV Active Functionality* | Minimum UV Exposure For Cure |
|---|---|---|
| Example 1 | $-CH_2CH_2CH_2OOCCH=CH_2$ | 3.0 sec. |
| Example 2 | $-CH_2CH_2CH_2OOCCH=CH_2$ | 1.5 sec. |
| Example 3 | $-CH_2CH_2CH_2OCH_2CH_2OOCCH=CH_2$ | 1.5 sec. |
| Example 4 | $-CH_2CH_2CH_2OCH_2CH_2OOCC(CH_3)=CH_2$ | 5.0 sec. |
| Example 5 | $-CH_2CH_2CH_2OOCCH=CH_2$ | 1.5 sec. |

*Reactive group attached to silicon atoms in the dimethyl silicone fluids.

Examination of the aforementioned data reveals that acrylic-functional silicones will cure faster than analogous methacrylic-functional silicones under otherwise identical conditions. Also, 'pre-crosslinked' acrylic-functional polymers (in which a vinyl-stopped dimethyl fluid was mixed with allychloride in the hydrosilation addition step of the syntheses) show significantly faster cure rates than strictly linear polymers.

EXAMPLE 6

64 ml. of methallyl chloride (used as furnished by Aldrich Chemical Co.) and 0.5 grams of a platinum-octyl alcohol complex (as prepared in accordance with the disclosure of U.S. Pat. No. 3,220,972) which provides, approximately, 20 ppm platinum were dissolved in 200 ml. of toluene in a 1 liter flask. 200 grams of a 95 centipoise viscosity dimethylhydrogen-chainstopped polydimethylmethylhydrogensiloxane copolymer fluid containing 9.9% MeH siloxy units were slowly added to the stirred toluene solution over a 30 minute period. Following this addition the complete reaction mixture was refluxed at 95°–110° C. for 15 hours, at which point no unreacted SiH could be detected by infrared spectroscopy. Excess methallyl chloride was removed under vacuum at 50° C. 24 grams of acrylic acid were then added to the flask along with 0.01 grams hydroquinone. 33 grams of triethylamine were slowly dropped into the reaction mixture under a nitrogen atmosphere. A white precipitate was noted as soon as the amine was introduced, additionally, an exotherm was observed at this time raising the flask temperature from 25° to 50° C. Following addition of the amine the reactants were heated to 113° C. for one hour. Toluene solvent plus unreacted acrylic acid and triethylamine were removed by stripping the product mixture in vacuo at 150°. Filtering the flask contents afforded 150 grams of a clear, pale yellow acrylic-functional silicone fluid product, having a viscosity of 217 centipoise.

EXAMPLE 7

51 ml. of methallyl chloride, 0.05 grams of the platinum catalyst utilized in Example 6 were dispersed in 150 grams toluene, to which solution 287 grams of a 150 centipoise viscosity dimethylhydrogen-chainstopped polydimethylmethyl hydrogen-siloxane copolymer fluid containing 7.3% methylhydrogensiloxy units were slowly added. Refluxing this solution at 115° for 16 hours removed all reactive $\equiv$SiH from the reaction mixture. After stripping off excess methallylchloride, 25 grams acrylic acid, 0.01 grams hydroquinone, and 35 grams triethylamine were added to the reaction flask as described in Example 1. Following the ensuing reaction, the solvent and excess reactants were stripped off in vacuo, the product filtered to furnish 240 grams of a hazy yellow acrylic-functional silicone fluid having a 570 centipoise viscosity.

Cure results are comparable to those reported for compositions prepared via allylchloride addition described in previous examples.

EXAMPLE 8

Because the cure mechanism for acrylic materials is free-radical initiated, election beam irradiation will also cure these acrylic-silicone release fluids. Materials prepared in this fashion, when mixed with effective quantities of standard photoinitiators and coated onto paper substrates, will cure to nonadherent surfaces when irradiated with either ultraviolet light or electron beam radiation in an inert atmosphere. For example, 10 gram samples of the acrylic-functional silicone fluids of Examples 6 and 7 were each mixed with 0.5 grams diethoxyacetophenone (DEAP, Upjohn Co.) and the mixtures were applied to 40 lb. SCK paper with a doctor blade. These coatings were cured by passing them under focused ultraviolet radiation supplied by two Hanovia medium-pressure mercury vapor UV lamps delivering 300 watts/inch$^2$ radiation housed in a PPG model 1202 AN Processor. Cure was qualitatively defined as formation of a smear-, migration-, and rub-off-free non-adherent surface as described above. Quantitative measurements of the release properties of cured films of the new compositions were also obtained. After the cured silicone coated SCK samples were aged at ambient conditions for 16 hours, a 6 mil thick layer of an aggressive SBR pressure sensitive adhesive obtained from Coated Products, Inc. was applied on top of the silicone layer, then cured for 10 minutes at room temperature and 2 minutes at 150° F. A second sheet of SCK stock was then firmly pressed onto the adhesive layer. Lamina so prepared were cut into 2×9 inch strips and aged at 75° F. for at least one hour. Release testing of these laminates was then accomplished by pulling the SCK/silicone lamina from the SCK/adhesive lamina at an angle of 180° at a rate of 400 inches per minute. The force required to separate the two lamina was recorded in grams. Results of a UV-cure and release testing are summarized below:

| Composition | UV Cure Time | Release |
|---|---|---|
| Example 6 | 3.0 sec. | 50–70 grams |
| Example 7 | 1.5 sec. | 60–80 grams |

EXAMPLE 9

The following examples illustrate how air inhibition of acrylic-silicone cure can be overcome by proper choice of photosensitizers. A composition was prepared in fashion analogous to Example 7 above resulting in a 549 centipoise viscosity fluid product containing 10 mole % acryloxy-substituted siloxane groups randomly sequenced along the linear chains of the polymer. 10 grams of this material were mixed with 0.4 grams of a 50% solution of benzophenone in N-vinylpyrrolidinone plus 0.3 grams N-methyldiethanolamine. Such a combination of photosensitizers and photoactivators is well known to persons skilled in the art and their use is taught in U.S. Pat. No. 3,795,807. This coating bath was applied to specimens of 40 lb. SCK with a doctor blade, the coated paper was then exposed to two Hanovia medium pressure mercury ultraviolet lamps mounted in a PPG Processor as described previously, except that an air atmosphere was selected rather than nitrogen. Smear-free and migration-free non-adherent coatings were obtained upon 0.6 seconds exposure to UV radiation under these conditions. 60 to 100 grams release versus a Coated Products aggressive SBR wet adhesive was observed for this cured material (release was determined as described previously). By way of comparison, when the same composition as found in Example 7 was catalyzed with diethoxyacetophenone, it would not cure in an air environment.

EXAMPLE 10

An acrylic silicone release composition was made in the following fashion: 200 grams of a 220 centipoise viscosity dimethylhydrogensiloxy-stopped polydimethylmethylhydrogensiloxane copolymer fluid having 8 wt. % methylhydrogen siloxy units on the polymer chain were weighed into a 1 liter flask. A total of approximately 0.27 moles reactive ≡SiH functionality was present. 20 grams methallylchloride and 0.05 grams of the same platinum catalyst utilized in Example 1 were then added and the mixture was refluxed in 250 grams toluene for 90 minutes. At the end of this reflux period less than 0.1 wt % unreacted ≡SiH could be detected, and excess methallylchloride was then removed by distillation of 50 ml of solvent and the excess methallylchloride at atmospheric pressure. Next, 17 grams acrylic acid (0.24 moles) and 9 grams pentaerythritol triacrylate (0.03 moles) were then added to the reaction flask, then 36 grams triethylamine were slowly added to the stirring reaction mixture at a pot temperature of 90° C. An exothermic reaction and a precipitate of triethylaminehydrochloride occurred as the amine was added to the reaction mixture. The product was then vacuum-stripped to 180° C. and filtered to yield 143 grams of a cloudy yellow methacrylic silicone fluid product of 625 centipoise viscosity. Cure performance of the acrylic-silicone was tested by blending 10 parts of this fluid with 0.5 parts diethoxyacetophenone (DEAP), this mixture was coated onto 40 lb. SCK paper with a doctor blade, and the silicone film was exposed to two focused medium-pressure mercury vapor ultraviolet lamps in an inert atmosphere for a period of time sufficient to cure the silicone to a non-adherent release coating as described previously. Exposure times as brief as 0.15 seconds were sufficient to cure this material to smear-free and migration-free non-adherent surfaces. Faster cure was possible, but the resultant silicone films were then easily rubbed-off of the paper substrates.

It should be noted that this example illustrates the use of acrylic acid and PETA in an 8:1 molar ratio as twin sources of reactive acrylic functionality. In principle, it should be possible to blend PETA (or similar hydroxy-containing multifunctional monomers such as trimethylolpropanediacrylate) with acrylic acid (or similar monofunctional monomers such as beta-hydroxyethylacrylate) in different molar ratios, or to utilize PETA alone, for the preparation of acrylic-silicone fluids according to the practice of this invention.

What is claimed as new and desired to be protected by Letters Patent of the United States is:

1. An acrylic functional polyorganosiloxane composition comprising: the reaction product of (A) an omega-haloalkene; (B) a dialkylhydrogen chainstopped polydialkylalkylhydrogensiloxane copolymer; (C) an amount of precious metal catalyst effective for catalyzing a hydrosilation reaction between said alkene and said siloxane copolymer; and (D) an acrylic functional monomer.

2. A composition as in claim 1 wherein said omega-haloalkene is selected from the group consisting of gamma-chloropropene, 4-chloro-1-butene, 10-chloro-1-decene, and 3-chloro-2-methylpropene.

3. A composition as in claim 1 wherein said dimethylhydrogen chainstopped polydialkyl-alkylhydrogen siloxane copolymer has the general formula:

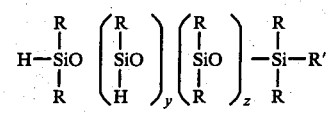

wherein each R represents, independently, a monovalent hydrocarbon radical; R' represents, independently, a hydrogen atom or a monovalent hydrocarbon radical; y plus z is an integer of, approximately, 25 to 600 such that said copolymer has a viscosity of, approximately 20 to 5000 centipoise at 25° C. and a hydrogen content of 0.5 to 50 weight % based on methylhydrogen siloxy unit functionality.

4. A composition as in claim 1 wherein said precious metal catalyst is a complex of chloroplatinic acid and a compound selected from the group consisting of octyl alcohol and divinyltetramethyldisiloxane.

5. A composition as in claim 1 wherein said acrylic functional monomer is selected from the group consisting of acrylic acid, methacrylic acid, 2-hydroxyethyl acrylate, 2-hydroxyethyl methacrylate, and pentaerythritoltriacrylate.

6. A composition as in claim 1 further comprising an amount of free radical photoinitiator effective for curing a 0.1 to 5.0 mil coating of said composition to a non-adherent film upon exposure to an amount of ultraviolet or electron beam radiation effective for curing said coating composition.

7. An article of manufacture comprised of a substrate and a film of 0.1 to 5.0 mils of the composition of claims 1 or 6 coated thereon.

8. An article as in claim 7 wherein said substrate is paper.

9. A process for providing acrylic functional polyorganosiloxane compositions comprising the steps of reacting (A) 1 to 50 parts by weight of an omega-chloro-1-alkene; (B) 50 to 99 parts by weight of a dialkylhydrogen chainstopped polydialkyl-alkylhydrogen siloxane copolymer and; (C) an amount of precious metal catalyst effective for catalysing a hydrosilation reaction between said alkene and said siloxane copolymer; and thereafter further reacting (D) 0.2 to 30 parts by weight of an acrylic functional moiety effective for providing a siloxane copolymer having 0.5 to 50 weight percent acrylic siloxy units.

10. A process as in claim 9 wherein said omega-chloro-1-alkene is selected from the group consisting of gamma-chloropropene, 4-chloro-1-butene, 10-chloro-1-decene, and 3-chloro-2-methylpropene.

11. A process as in claim 9 wherein said dimethylhydrogen chainstopped polydialkyl-alkylhydrogen siloxane copolymer has the general formula:

wherein each R represents, independently, a monovalent hydrogen atom or a monovalent hydrocarbon radical; y plus z is an integer of, approximately, 25 to 600 such that said copolymer has a viscosity of, approximately, 20 to 5000 centipoise at 25° C. and a hydrogen content of 0.5 to 50 weight % based on methylhydrogensiloxy unit functionality.

12. A process as in claim 9 wherein said precious metal catalyst is a complex of chloroplatinic acid and a compound selected from the group consisting of octyl alcohol and divinyltetramethyldisiloxane.

13. A process as in claim 9 wherein said acrylic functional monomer is selected from the group consisting of acrylic acid, methacrylic acid, 2-hydroxyethyl acrylate, 2-hydroxyethyl methacrylate, and pentaerythritoltriacrylate.

14. A process as in claim 9 further comprising the steps of adding an amount of free radical photoinitiator effective for curing a 0.5 to 5.0 mil coating of said composition to a non-adherent film applying a coating of said composition to a substrate, and exposing said coating to an amount of ultraviolet or electron beam radiation effective for curing said coating.

15. A process for as in claim 14 wherein said free radical photoinitiator is selected from the group consisting of alkylbenzoin ethers, benzophenone, diethoxyacetophenone, and Michler's ketone.

16. A process for providing an article of manufacture comprised of a substrate and a film of 0.5 to 5.0 mils of the composition of claim 1 coated thereon.

17. A process for providing an article as in claim 16 wherein said substrate is paper.

* * * * *